United States Patent [19]
Nichols

[11] 3,878,911
[45] Apr. 22, 1975

[54] HYDRAULICALLY PROPELLED HIGH CLEARANCE AGRICULTURAL VEHICLE

[76] Inventor: William J. Nichols, 2006 W. 103rd Ave., Lowell, Ind. 46356

[22] Filed: Mar. 8, 1974

[21] Appl. No.: 449,262

[52] U.S. Cl. .................................. 180/51; 180/44 F
[51] Int. Cl. ..................... B62d 23/00; B60k 7/00
[58] Field of Search ............. 180/44 F, 49, 51, 66 F; 280/32.5; 239/213

[56] References Cited
UNITED STATES PATENTS

| | | | |
|---|---|---|---|
| 3,154,164 | 10/1964 | Shaw | 180/44 F |
| 3,342,282 | 9/1967 | Forpahl | 180/51 |
| 3,521,720 | 7/1970 | Korotkin | 180/51 |
| 3,645,406 | 2/1972 | Brazell | 180/66 F X |
| 3,770,076 | 11/1973 | Ward | 180/44 F X |
| 3,825,087 | 7/1974 | Wilson | 180/51 X |

FOREIGN PATENTS OR APPLICATIONS

| | | | |
|---|---|---|---|
| 1,918,080 | 5/1970 | Germany | 180/49 |
| 690,982 | 1940 | Germany | 180/49 |

Primary Examiner—David Schonberg
Assistant Examiner—Terrance L. Siemens
Attorney, Agent, or Firm—Burmeister, York, Palatier, Hamby & Jones

[57] ABSTRACT

A hydraulically powered-self-propelled sprayer which has a front frame pivotally coupled to a rear frame, and each frame being suspended from a dual branch leg assembly which carries a pair of reversable hydraulic motors and drive wheels. The hydraulic motors are powered by an engine and pump mounted on the front frame, and hydraulic fluid circulates to and from the motors through the dual branches of the leg assemblies. The leg assemblies are removable and may be replaced with larger or smaller leg assemblies to elevate or lower the sprayer. The sprayer is steered by actuating a pair of hydraulic cylinders mounted on one of the frames and coupled to the other to position one frame angularly with respect to the other. A sprayer tank is mounted on the rear frame, and a collapsible boom is provided for spraying agricultural crops.

17 Claims, 8 Drawing Figures

HYDRAULICALLY PROPELLED HIGH CLEARANCE AGRICULTURAL VEHICLE

The present invention relates to vehicles, and in particular to agricultural vehicles. Specifically, the present invention relates to self-propelled sprayers.

Self-propelled agricultural sprayers have been known for a number of years. They are particularly useful in spraying row crops, the wheels of the sprayer traversing the space between rows. It is necessary for the portions of sprayers which are disposed over the rows to be spaced from the ground by a distance at least equal to the height of the rows, and hence the sprayers must be relatively tall pieces of equipment. Many of the sprayers have utilized two drive wheels and a single front wheel, the sprayer itself passing between two different rows and supporting a boom which extends outwardly from both sides of the sprayer to spray a relatively large area at a time.

The sprayers previously known have tended to be unstable in that they tip easily on hilly terrain. It is one of the objects of the present invention to provide a sprayer which is more stable than the sprayers which have previously been known.

Another disadvantage of prior sprayers has been that they lack traction and tend to become stuck in wet soils. It is an object of the present invention to provide a sprayer with improved traction.

It is further an object of the present invention to provide a sprayer which may readily be modified to accommodate row crops of different heights, or row crops of different spacings.

According to the present invention, a sprayer is provided which has a forward portion which is pivotally connected to a rearward portion, both the forward portion and rearward portion being suspended centrally from a leg assembly which carries a pair of hydraulic motors and wheels at its lower extremity. Each leg assembly extends outwardly from the relatively narrow forward or rearward portion which is adapted to pass between rows of crops, the rows being disposed between the portion of the sprayer and the depending leg of the leg assembly, thereby providing a low center of gravity. Further, the wheels are hydraulically powered by motors located on the leg assemblies adjacent to the axle of the wheels, the leg assemblies providing a dual hydraulic conduit. The entire sprayer may be raised or lowered by substituting a leg assembly of a different height, and the spacing between rows may be changed by substituting leg assemblies of different widths.

The present invention will be more fully described in connection with the accompanying drawings, in which.

Figure 1:
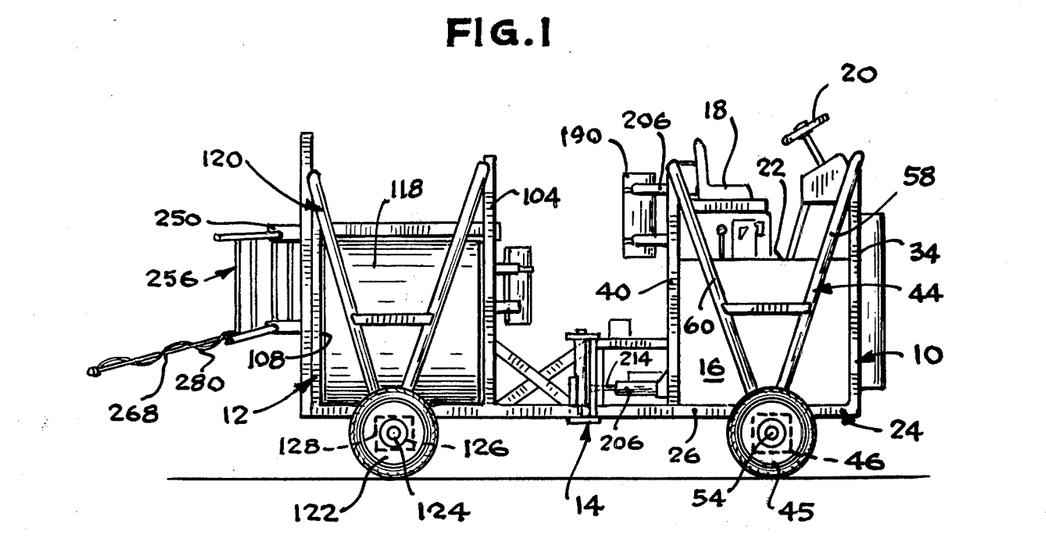
FIG. 1 is a side elevational view of a sprayer constructed according to the present invention.

As illustrated in FIG. 1, the sprayer has a support frame comprising a front frame 10 which is attached to a rear frame 12 by a pivotal coupling 14. The front frame 10 supports a motor compartment 16 and has a driving position including a seat 18 and a steering wheel 20. The seat 18 is mounted on a floor 22 secured on the front frame 10. The front frame 10 has a rectangular base 24 formed by a pair of parallel side members 26 and 28 and a pair of parallel end members 30 and 32. A pair of forward support columns 34 and 36 extend normally from one end of the side members 26 and 28, and a tie bar 38 extends between the support columns 34 and 36 at the ends thereof remote from the end member 30. A second pair of support columns 40 and 42 extend from the ends of the end member 32 of the base 24 normally and the support columns 40 and 42 are equal in length to the support columns 34 and 36.

Figure 2:
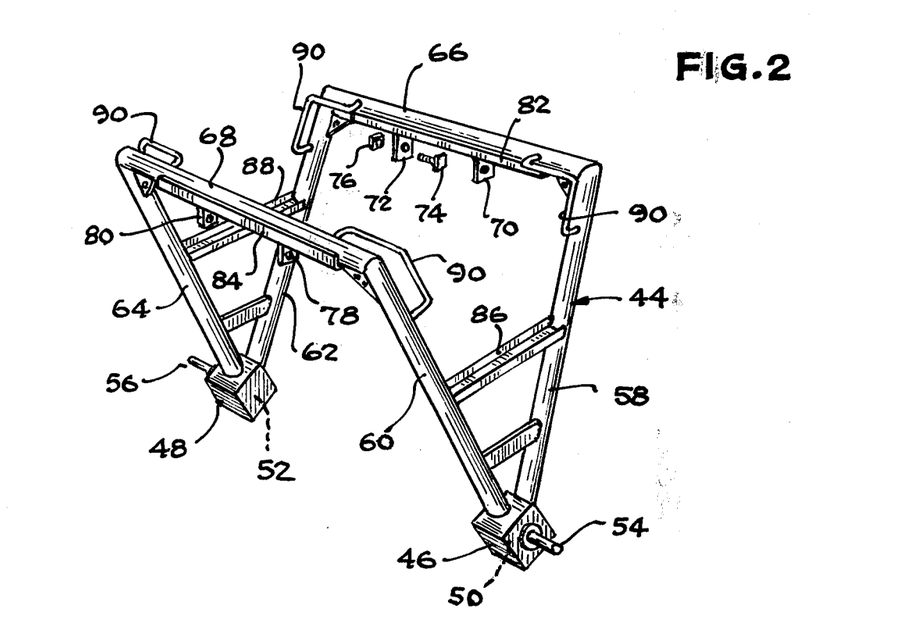
FIG. 2 is an isometric view of one of the leg assemblies illustrated in FIG. 1.
Figure 3:
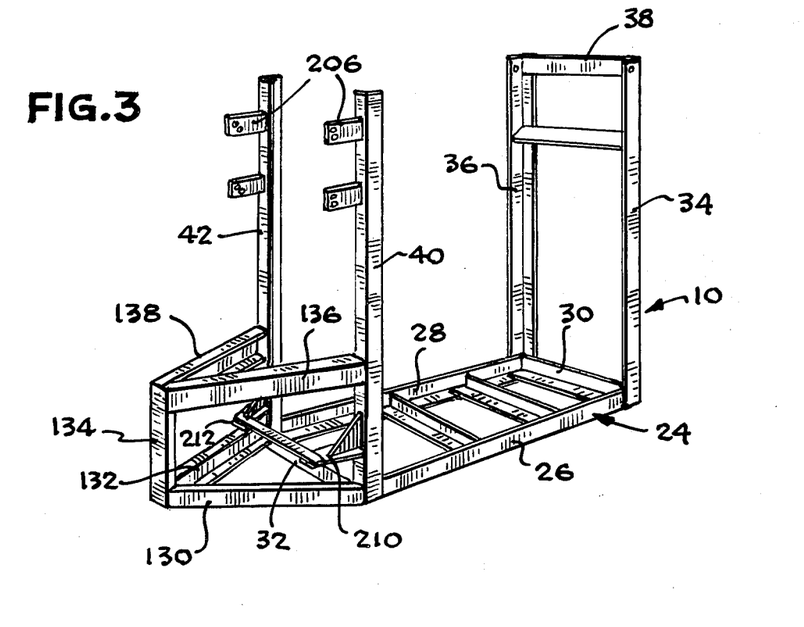
FIG. 3 is an isometric view of the front frame assembly of the sprayer illustrated in FIG. 1.

A U-shaped yoke or leg assembly 44 is mounted on the ends of the forward support columns 34 and 36 and the rearward support columns 40 and 42, and the leg assembly 44 supports a pair of wheels 45 and 47 which both support the sprayer and provide motive power for the sprayer.

The leg assembly 44 has a pair of motor housings 46 and 48 which contain hydraulic motors 50 and 52. Each of the hydraulic motors has a shaft 54 and 56, and the shafts 54 and 56 are on a common axis. A pair of legs 58 and 60 extend upwardly from the motor housing 46 at an angle with respect to each other, and a second pair of legs 62 and 64 extend upwardly from the motor housing 48 at the same angle as the legs 58 and 60. The legs 58, 60, 62 and 64 are all of the same length. The ends of the legs 58 and 62 opposite the motor housings 46 and 48 are interconnected by a cross leg 66 which disposed normal to the legs 58 and 62. In like manner, the ends of the legs 60 and 64 opposite the motor housings are interconnected by a cross leg 68, thereby maintaining the legs 58 and 60 in one plane and the legs 62 and 64 in a second parallel plane. The cross leg 66 has a pair of hanger tabs 70 and 72 depending therefrom at equal distances on opposite sides of the center of the cross leg 66, and the hanger tab 70 abuts the support column 36 while the hanger tab 72 abuts the support column 34. The tabs 70 and 72 and the confronting surfaces of the support columns 36 and 34 are provided with apertures, and bolts 74 extend therethrough and are secured by nuts 76 to securely mount the cross leg 66 on the support columns 34 and 36.

In like manner, the support leg 68 has hanger tabs 78 and 80 which depend therefrom and abut the confronting surfaces of the support columns 40 and 42 and are secured thereto by bolts 74 and nuts 76. A support bar 82 is mounted on the cross leg 66 between the tabs 70 and 72 and the cross leg 66, and a similar support bar 84 is mounted between the tabs 78 and 80 and the cross leg 68 to add structural stability. Also, a cross member 86 is mounted between the legs 58 and 60, and a second member 88 is mounted between the legs 62 and 64 to provide structural support for the leg assembly 44 and also to provide a step to aid the operator in assuming the operating position on the floor 22. Hand rails 90 are also provided for safety and the convenience of the operator at the intersection of the cross legs 66 and 68 and the legs 58, 60, 62 and 64 respectively.

Figure 4:
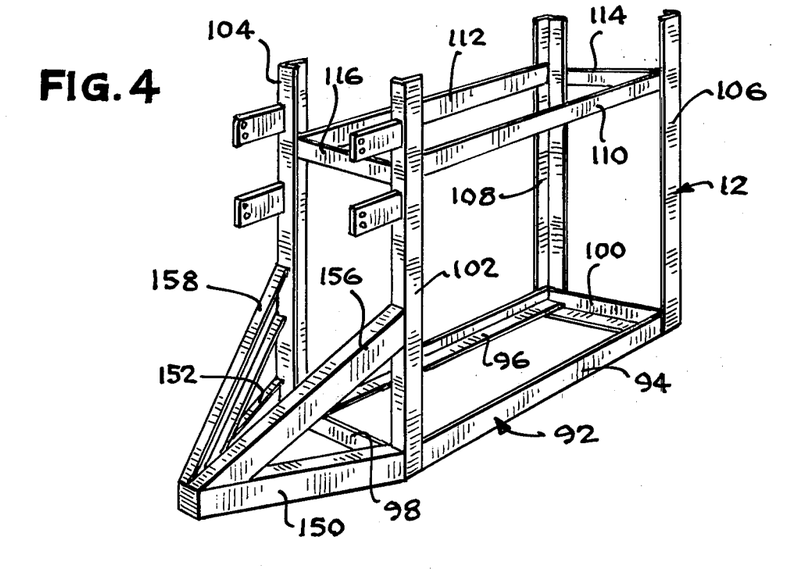
FIG. 4 is an isometric view of the rear frame assembly of the sprayer of FIG. 1.

The rear frame 12 is also provided with a rectangular base 92 having side members 94 and 96 and a front cross member 98 and rear cross member 100. A pair of parallel forward support columns 102 and 104 extend from the junction of the side member 94 and front cross member 98, and the side member 96 and front cross member 98, respectively. In like manner, a pair of parallel rear support columns 106 and 108 extend from the ends of the rear support cross member 100. The support columns 102, 104, 106 and 108 are all of the same length and are parallel to each other, and the support columns are structurally supported by side supports 110 and 112 and end supports 114 and 116 which form a rectangular frame extending between the forward and rear support columns. The rear frame 12 accomodates a large tank 118 which contains the material to be sprayed.

A second leg assembly 120, identical in construction to the leg assembly 44, is mounted on the upper ends of the four support columns 102, 104, 106, and 108 in a manner identical to the support for the leg assembly 44 on the front frame 10. The leg assembly 120 supports a pair of wheels 122 and 123 on shafts 124 and 125 of hydraulic motors 126 and 127 mounted in the rectangular motor housings 128 and 129 at the ends of the legs 58 and 60, and 62 and 64 of the leg assembly 120.

Figure 5:
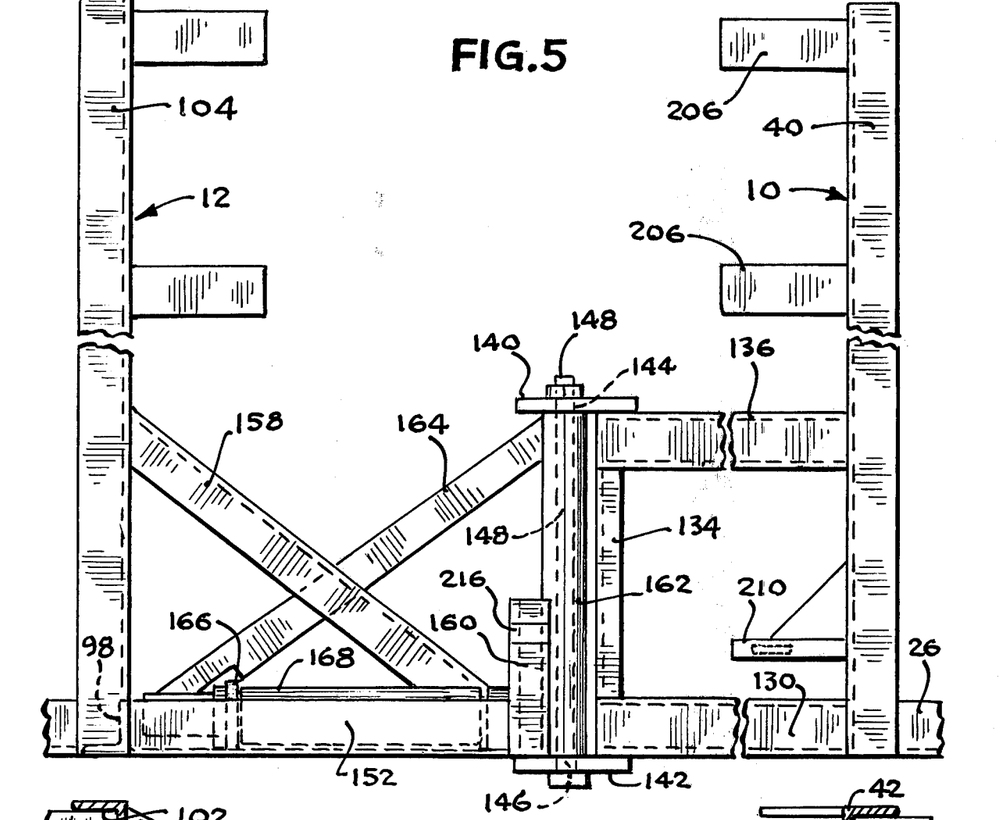
FIG. 5 is a side elevational view of the coupling between the front and rear portions of the sprayer of FIG. 1.
Figure 6:
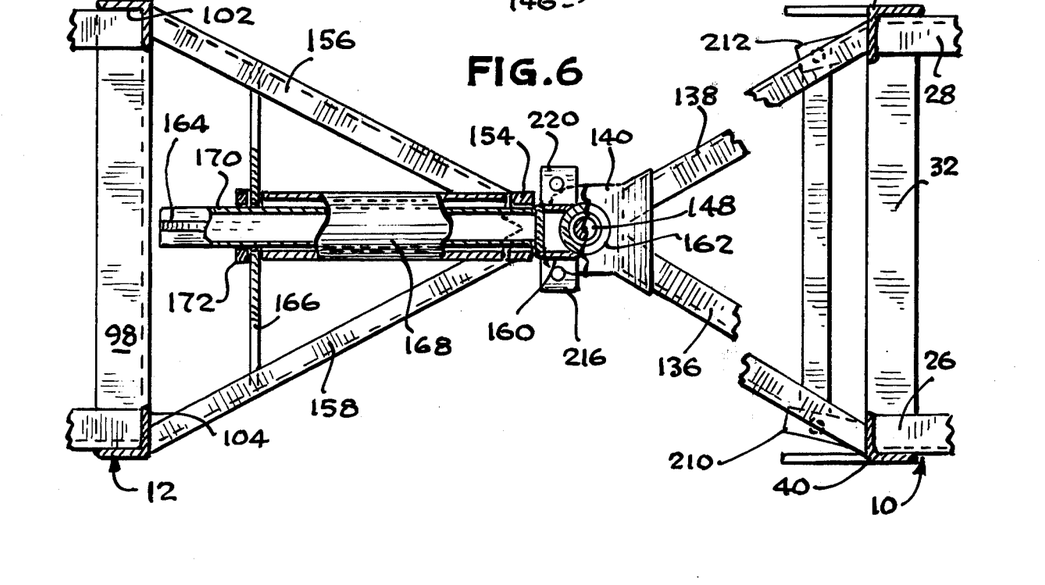
FIG. 6 is a planned view of the coupling between the front and rear portions of the sprayer of FIG. 1.

The front frame 10 is coupled to the rear frame 12 through the pivotal coupling assembly 14. A first pair of kingpin support members 130 and 132 extend rearwardly from the opposite ends of the cross bar 32 in the same plane as the base 24, and the ends of the kingpin support members 130 and 132 remote from the crossbar 32 are secured at a common point at one end of a kingpin reach 134 which extends upwardly perpendicularly from the plane of the base 24. A second pair of kingpin support members 136 and 138 extend from the end of the kingpin reach 134 opposite the support members 130 and 132 to the rear support columns 40 and 42 of the front frame 10. A first apertured plate 140 is mounted at the upper end of the reach 134 on the reach and the support members 136 and 138, and a second apertured plate 142 is mounted on the lower end of the reach 134 and on the kingpin support members 130 and 132. The apertures in the plates 140 and 142 (designated 144 and 146 respectively) are aligned on an axis perpendicular to the plane of the base 24 of the front frame 10, and a kingpin 148 extends through the apertures 144 and 146 and is mounted therein.

The rear frame 12 has a pair of support members 150 and 152 extending forwardly from the crossbar 98 in the base 92 of the rear frame 12. The support members taper inwardly and are secured on a circular flange 154. Further, a pair of braces 156 and 158 extend from the flange 154 to the forward support columns 102 and 104 of the rear frame 12.

Three flat plates are secured together to form a channel member 160 which is mounted on the rear section of the sprayer and is disposed vertically. A hollow sleeve 162 is secured on the channel member 160 and is positioned between the apertured plates 140 and 142 and journals the pivot pin 148. A brace 164 extends from the upper end of the tube 162 to the central portion of the crossbar 98 to support the tube 162. In addition, a pivot support plate 166 is secured at its opposite ends to the support members 150 and 152, and the plate 166 supports an elongated tube 168 which extends to the flange 154. A hollow sleeve 170 is journaled within the tube 168, and one end of the sleeve 170 is secured on the channel 160. A collar 172 is secured about the sleeve 170 on the side of the plate 166 opposite the channel 160, and the flange 172 prevents the sleeve 170 from being translated outwardly in the tube 168.

The pivotal coupling 14 thus permits the front frame 10 to be pivoted with respect to the back frame 12 as a result of the pivot provided by the pin 148 and sleeve 170, the tube 162 being secured to the back frame 12 and the pin 148 being secured to the front frame 10. However, the pivotal coupling 14 also permits pivotal action along the axis of the sleeve 170. Only the brace 164 limits the pivotal motion of the tube 162 about the axis of the sleeve 170, thus permitting the front portion of the sprayer to tilt at a different angle than the rear portion of the sprayer in response to changes in terrain.

Figure 7:
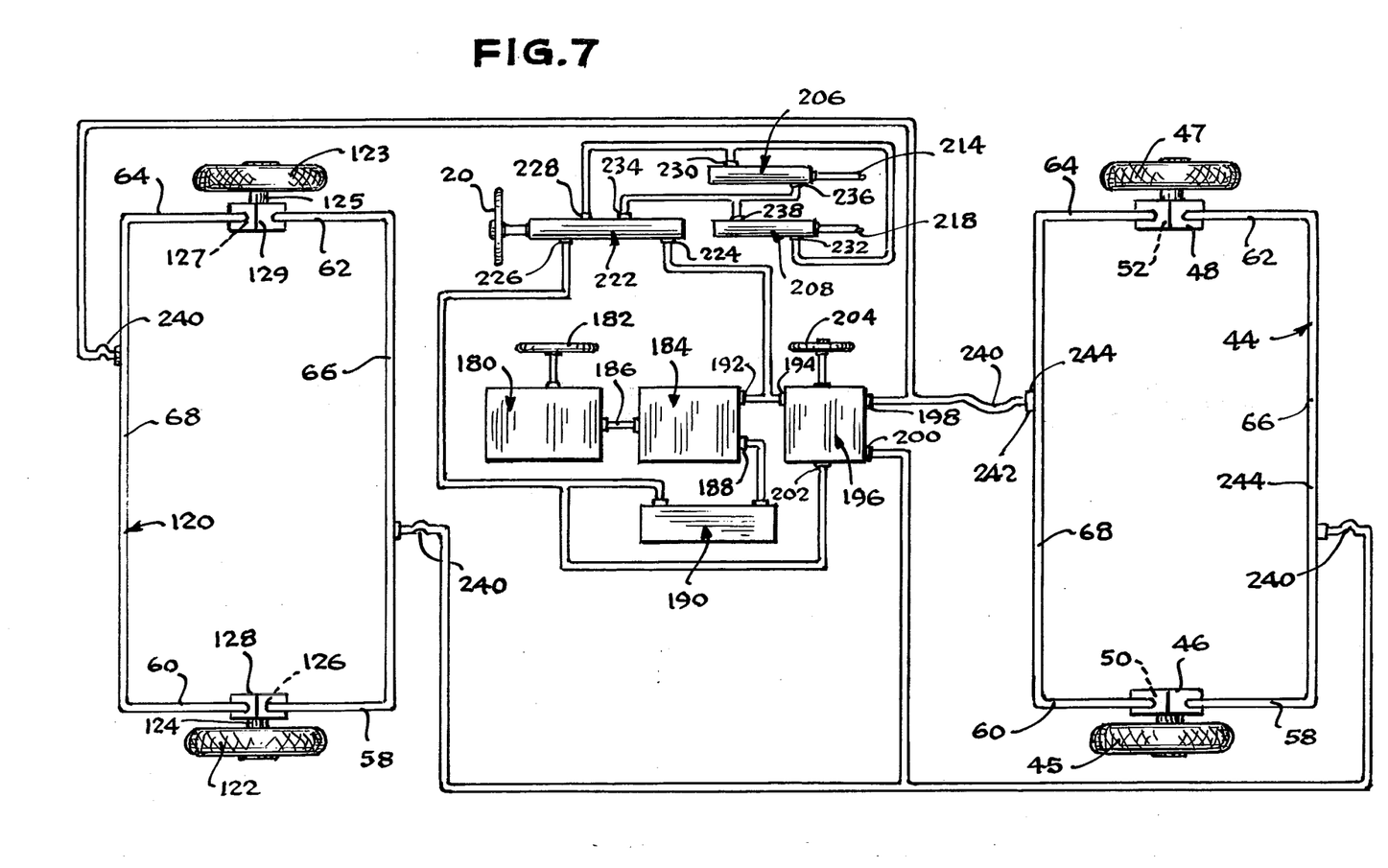
FIG. 7 is a schematic view illustrating the hydraulic system of the sprayer of FIG. 1.

Each of the four motors 50, 52, 126 and 127 are hydraulic motors which are reversible depending upon the direction of fluid flow. The leg assembly 44 provides two separate hydraulic fluid conduits for the hydraulic motors 50 and 52. One conduit utilizes the cross leg 66, and the legs 58 and 62. The other fluid conduit utilizes the cross leg 68 and the legs 60 and 64. In like manner, the leg assembly 120 provides two separate conduits on the hydraulic motors 126 and 127, identical reference numerals being utilized for the cross legs and legs of the leg assembly 120 as utilized for the leg assembly 44.

An internal combustion engine 180 located within the engine compartment 16 is utilized to provide the power for operating the sprayer. The speed of the engine is controlled by mechanical actuator 182 illustrated in the form of a knob, although a lever or some other device may also be utilized. The engine 180 drives a hydraulic pump 184 through a mechanical connection 186, and the pump has an inlet 188 which is connected to a sump 190. The pump also has an outlet 192 connected to the input 194 of a control unit 196. The contol unit 196 has two controlled outlets 198 and 200, and a fluid return outlet 202 which is connected to the inlet of the sump. One of the pressure controlled oulets 198 of the control unit 196 is connected through flexible couplings to the leg 68 of both the forward leg assembly 44 and the rearward leg assembly 120, while the other pressure controlled outlet 200 is connected through flexible couplings to the cross legs 66 of both the forward leg assembly 44 and the rearward leg assembly 120.

The control unit 196 is provided with a swash plate under an external mechanical control illustrated as a knob 204, and the position of the knob 204 is effective to control the relative pressure between the controlled pressure outlets 198 and 200. By control of the position of the swash plate through the external mechanical adjustment knob 204, a differential pressure in either direction of identical magnitude may be applied to each of the four hydraulic motors 50, 52, 126 and 127. The pump 184 draws hydraulic fluid from the sump 190 through its inlet 188, and delivers hydraulic fluid under pressure through the inlet 194 of the control unit 196 to provide the pressurized hydraulic fluid which appears in the pressure controlled outlets 198 and 200 of the control unit 196. Any excess in the pressure supplied to the inlet 194 of the control unit 196 is transmitted through the outlet 202 to the inlet of the sump 190.

The sump 190 is mounted on the rearward support columns 40 and 42 of the front frame assembly 10 by means of brackets 206.

Since all four wheels 45, 47, 122 and 123 of the sprayer are driven in an identical manner hydraulically, the four wheels will rotate at essentially the same speed. As a result, the forward frame and unit is transported at the same rate as the rearward frame and unit, and there is little or no force applied on the cylindrical coupling member 170 tending to translate this member 170 with respect to the tube 168, and therefore the collar 172 has little strain in maintaining the forward and rearward units of the sprayer in integral relationship.

Further, the pivotal coupling permits the forward unit and the rearward unit to individually adjust to changes in terrain. As a result, the forward wheels 45 and 47 will rest with approximately equal pressure on the terrain at all times, and the rearward wheels 122 and 123 will rest upon the terrain with equal pressure at all times even though the slope upon which the forward wheels rest is different than the slope upon which the rearward wheels rest due to the fact that the pivotal coupling 14 can adjust for differences in terrain by rotation of the sleeve 170 with respect to the tube 168. Accordingly, a sprayer constructed according to the present invention has the advantage of a three-wheeled vehicle in that each of the wheels at all times carries its proper pressure with respect to the ground or terrain even though no spring or other adjustment means is provided to compensate for differences in terrain. It will be noted from FIG. 1 that the forward wheels 45 and 47 are disposed upon a vertical plane which is located centrally of the forward frame 10, and the center of gravity of the forward unit is located in this plane. Likewise, the wheels 122 and 123 are disposed in a vertical plane centrally of the rearward frame 12, and the center of gravity of the rearward portion of the sprayer is likewise located in this plane. Further, the two centers of gravity are located as low as possible, the engine compartment being on the base 24 of the front frame 10 and the tank 118 resting on the base 92 of the rear frame, and hence the sprayer may be positioned on a sever incline without shifting the center of gravity beyond the vertical plane of contact of of the wheels with the terrain. Further, since each of the wheels exert equal pressure on the terrain, the vehicle minimizes the liklihood of any wheel losing traction with respect to the terrain. Further, the pivotal coupling 14 prevents forces from developing within the forward frame 10 or rearward frame 12 as a result of differences in the terrain level on the front wheels 45 and 47 with respect to the back wheels 122 and 123 thereby avoiding torsion stresses on the frame and permitting the frames to be constructed of lighter materials.

The sprayer is steered by pivoting the forward unit with respect to the rearward unit at the pivotal coupling 14. Two hydraulic cylinders 206 and 208 are mounted on tabs 210 and 212, respectively, the tab 210 being mounted on the forward column 40 of the front frame 10 and the tab 212 being mounted on the forward column 42 of the frame 10. The hydraulic cylinder 206 has a translatable shaft 214 which is secured at its end opposite the cylinder on a tab 216 extending outwardly from the channel 160, and the cylinder 208 has a translatable shaft 218 which is pivotally mounted on its end opposite the cylinder on tab 220 extending outwardly from the channel member 160.

The cylinders 206 and 208 are hydraulically controlled by a four-way valve 222 which is positioned by the steering wheel 20 of the sprayer. The valve 222 has an inlet 224 connected to the outlet 192 of the pump 184, and an outlet 226 connected to the inlet of sump 190. The valve 222 has a first control port 228 which is connected to the opening 230 at one end of the cylinder 206 and to the opening 232 at the other end of the cylinder 208. The valve 222 has a second controlled opening 234 which is connected to an opening 236 at the other end of the cylinder 206 and an opening 238 at the first end of the cylinder 208. In this manner, rotation of the steering wheel 20 in one direction will result in the rod 214 being translated outwardly from the cylinder 206 while the rod 218 is translated inwardly of the cylinder 208, and vice versa.

For stability and ease of operation, it is desirable that the sprayer be positioned as close to the level of terrain as permissible, and hence the leg assemblies 44 and 120 are provided with legs 58, 60, 62 and 64 which will position the four wheels 45, 47, 122 and 123 slightly below the bases 24 and 92 of the frames 10 and 12. However, as crops grow, it is necessary to elevate the bases 24 and 92 of the frames 10 and 12 to maintain clearance over the crops, and this can be accomplished by removing the forward leg assembly 44 and the rearward leg assembly 120 and replacing these leg assemblies with a second pair of leg assemblies identical in construction to the first pair of leg assemblies except that the legs 58, 60, 62 and 64 are of greater length, thereby positioning the wheels 45, 47, 122 and 123 at a further distance below the frames 10 and 12 of the sprayer. The sprayer has been designed to permit the exchange of leg assemblies in a simple, rapid manner.

The crossbars 66 and 68 are each connected to the control unit 196 through flexible hoses disignated 240, and these hoses have screw fittings 242 which mate with threads in a coupler 244 mounted on the cross arms 66 and 68. The hydraulic system may be disconnected by simply unscrewing the couplers 242 from the couplers 244 on each of the cross arms 66 and 68. Thereafter, it is merely necessary to remove the nut 76 and bolt 74 from each of the tabs 70, 72, 78 and 80 to mechanically disconnect each of the leg assemblies 44 and 120 from the forward frame 10 and the rearward frame 12. Thereafter, a substitute leg assembly 44 may be mounted on the forward frame 10 and a substitute leg assembly 120 may be mounted on the rearward frame 12 by reversing the foregoing operation.

Figure 8:
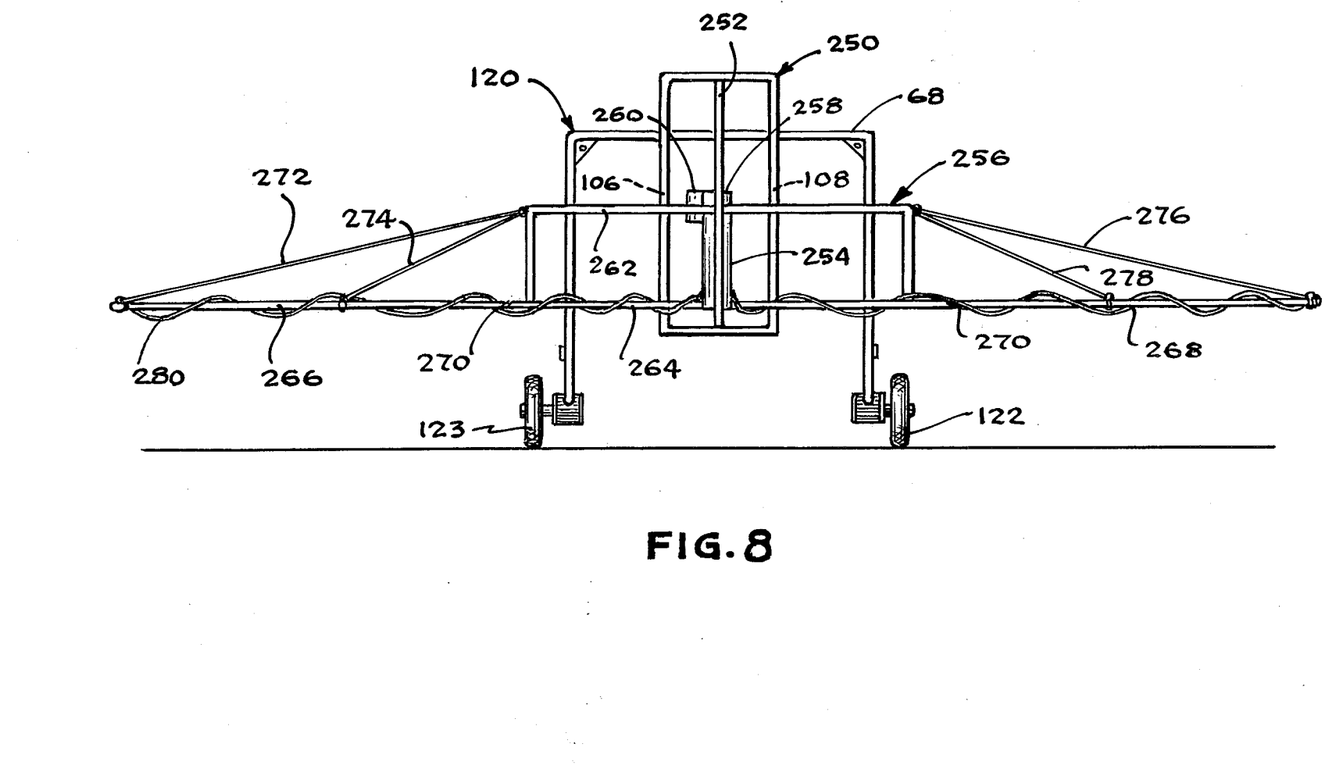
FIG. 8 is a rear elevational view of the sprayer of FIG. 1.

As illustrated, the sprayer is attached to a frame 250 to the rear frame 12, although it should be understood that the sprayer frame 250 may also be attached to the front frame 10. Frame 250 is mounted on the support columns 106 and 108. The frame has a central screw 252 which is secured thereon, and journaled within a sleeve 254. The sleeve is mounted on a rectangular frame 256 being parallel to the cross leg 68 of the leg assembly 120. The sleeve 254 has a collar 258 engaging the threaded shaft 252 and the collar 258 is driven by a motor 260 mounted on the frame 256, thus permitting the frame 256 to be raised or lowered by energizing the reversible motor 260.

The frame 256 has an upper bar 262 which is disposed parallel to the lower bar 264, and two extending arms 266 and 268 extend outwardly from the lower bar 264. Each of the arms has a pivot joint 270 adjacent to the frame 256 to permit the arms to be pivoted with respect to the frame 10 of the sprayer. The arm 266 is supported by two guy wires 272 and 274 which extend to the end of the upper arm 262 of the frame 256, and the arm 268 is supported by guy wires 276 and 278 in like manner. A perforated tube 280 extends along the arms 266, 264 and 268 and is connected through conventional spraying equipment to the tank 118 to provide the spraying function for the selfpropelled sprayer.

Those skilled in the art will readily develop modifications for the sprayer set forth herein, and uses for the sprayer and vehicle set forth herein not specifically disclosed. It is therefore intended that the scope of the present invention be not limited by the foregoing specification, but rather only by the appended claims.

The invention claimed is:

1. An agricultural vehicle adapted to be self propelled on a supporting surface comprising a support frame, a source of hydraulic fluid under pressure mounted on the frame including a prime mover and a hydraulic pump provided with two ports, a yoke assembly having two tubular legs, each leg having a straight central portion and two end portions of equal length extending normally from the central portion thereof parallel to each other, said legs being mounted together at their ends with each leg disposed in a plane at an acute angle to the plane of the other leg, said yoke assembly having a pair of hydraulic motors, each hydraulic motor being mounted on the yoke at a different end of each leg, and said hydraulic motors having drive shafts disposed on a common axis parallel to the central portions of the two legs, each of said hydraulic motors having a first port and a second port for connection into a hydraulic system, said first port being connected to the adjacent end of one of the legs and said second port being connected to the adjacent end of the other leg, said yoke assembly being mounted on the support frame with the central portions of the legs disposed on the side of the frame opposite the supporting surface, each of the legs having an opening in the central portion thereof, means connected to each of the openings for coupling each opening to one of the ports of the hydraulic pump, and a wheel mounted on the drive shaft of each hydraulic motor.

2. An agricultural vehicle for use with row crops comprising the combination of claim 1 wherein two yoke assemblies are mounted on the frame in spaced relation, each of said yoke assemblies having central portions substantially longer than the width of the frame, whereby the vehicle may be used in a field with parallel rows of crops positioned to permit two adjacent rows to pass on opposite sides of the frame, each of said rows passing between the end portions of the yoke assembly and the frame.

3. An agricultural vehicle comprising the combination of claim 1 wherein the frame has a pair of parallel front support columns and a pair of back support columns parallel to the front columns, the central portion of one leg of the yoke assembly being mounted on the front support columns and normal thereto and the central portion of the other leg of the yoke assembly being mounted on the rear support columns and normal thereto.

4. An agricultural vehicle comprising the combination of claim 2 wherein the means for coupling each of the openings in the central portions of legs of the yoke assemblies to the hydraulic pump includes a releasable connection at the central portion of each leg of each yoke assembly, and the means mounting the yoke assemblies on the frame are releasable for removal of the yoke assemblies from the frame.

5. An agricultural vehicle comprising the combination of claim 2 wherein the support frame comprises a front frame and a rear frame, the front frame being coupled to the rear frame by a coupling mounted between the front frame and rear frame having a pivotal axis vertical with respect to one of the frames.

6. An agricultural vehicle comprising the combination of claim 5 wherein the coupling mounted between the front frame and the rear frame has a pivotal axis horizontal with respect to the other frames of the support frame.

7. An agricultural vehicle comprising the combination of claim 5 wherein the coupling comprises a pair of parallel plates mounted one above the other on the adjacent end of the front frame, each of said plates having an aperture extending therethorough, a kingpin extending through the apertures and mounted on the plates, a hollow sleeve rotatably disposed about the kingpin and extending between the plates, a second sleeve mounted on the first sleeve and extending normally from the first sleeve, and journal means mounted on the rear frame associated wtih the second sleeve for rotatably moonting said second sleeve on the rear frame.

8. An agricultural vehicle comprising the combination of claim 5 in combination with means for controlling the direction of movement of the vehicle including a hydraulic fluid system having a first hydraulic cylinder mounted on one of the frames and having a piston coupled to the other frame, and a second hydraulic cylinder mounted on the other frame and having a piston coupled to the one frame, and means for controlling the flow of hydraulic fluid to the cylinders.

9. An agricultural vehicle adapted to be self propelled on a supporting surface comprising a front frame having an axis of elongation and a first pair of parallel support columns extending from one end of the axis of elongation on opposite sides sides thereof and a second pair of parallel support columns extending parallel to the first pair of support columns at the other end of the axis of elongation on opposite sides thereof, a source of hydraulic fluid under pressure including a prime mover and a hydraulic pump mounted having a first and second port on the base of the front frame, said hydraulic pump being provided with an inlet port and an outlet port, a yoke assembly having two tubular legs, each leg having a central portion and two generally parallel end portions extending from opposite ends of the central portion, the end portions extending from opposite ends of the central portion, the end portions of both legs being mounted together, a pair of hydraulic motors mounted on the end portion of the legs having axes extending outwardly of the motors on a common axis, one of said motors being mounted on the one end portion of each leg and having a pair of hydraulic ports in communication with said one end portion of each leg respectively, the other of said motors being mounted on the other end portion of each leg and having a pair of hydraulic ports in communication with said other end portion of each leg respectively, a first wheel mounted on the shaft of the first hydraulic motor and a second wheel mounted on the shaft of the second hydraulic motor, the central portion of one leg of said leg assembly being mounted on the first pair of support columns and the central portion of the other leg of said leg assembly being mounted on the second pair of support columns, a first hydraulic coupling means connected between the central portion of the first leg of the yoke assembly and the first port of the hydraulic pump, a second hydraulic coupling means connected between the central portion of the other leg of the yoke assembly and the second port of the hydraulic pump, and means operatively associated with the frame for supporting the frame including a wheel engaging the supporting surface.

10. An agricultural vehicle adapted to be self propelled on a supporting surface comprising the combination of claim 9 wherein the central portions of the legs of the yoke are substantially straight, and the end portions are substantially straight and extend from the central portions perpendicularly.

11. An agricultural vehicle comprising the combination of claim 9 wherein the hydraulic motors are reversible, and the first and second hydraulic coupling means include a hydraulic flow reversing mechanism.

12. An agricultural vehicle comprising the combination of claim 9 wherein the means operatively associated with the frame for supporting the frame including a wheel comprises a second frame having an axis of elongation and a first pair of parallel support columns extending from one end of the axis of elongation on opposite sides thereof and a second pair of parallel support columns extending parallel to the first pair of support columns at the other end of the axis of elongation of the second frame on opposite sides thereof, a second yoke assembly having two tubular legs, each leg having a central portion and two generally parallel end portions extending from opposite ends of the central portion, a second pair of hydraulic motors mounted on the end portions of the legs of the second yoke assembly, said hydraulic motors having axes extending outwardly of the motors on a common axis, one of said motors being mounted on the one end portion of each of the second leg assembly having a pair of hydraulic ports in communication with said one end portion of each leg respectively, the other of said motors of the second pair being mounted on the other end portion of each leg of the second leg assembly and having a pair of hydraulic ports in communication with the other end portion of each leg of the second leg assembly respectively, a third wheel mounted on the shaft of one of the hydraulic motors of the second pair and a fourth wheel mounted on the shaft of the other hydraulic motor of the second pair, the central portion of one leg of said second leg pair, the central portion of one leg of said second leg assembly being mounted on the first pair of support columns of the second frame, and the central portion of the other leg of said second leg assembly being mounted on the second pair of support columns of the second frame, a third hydraulic coupling means connected between the central portion of the first leg of the second yoke assembly and the first port of the hydraulic pump and a fourth hydraulic coupling means connected between the central portion of the other leg of the second yoke assembly and the second port of the hydraulic pump.

13. An agricultural vehicle comprising the combination of claim 12 wherein the second frame is mounted on the first frame by a pivotal coupling.

14. An agricultural vehicle comprising the combination of claim 13 wherein the pivotal coupling comprises a kingpin support structure mounted on the first frame including two spaced parallel confronting plates, a kingpin mounted on said plates and extending therebetween on an axis parallel to the support columns of the first frame, a first sleeve rotatably disposed about the kingpin and between the two plates, a second pin mounted on the first sleeve and extending normally from the first sleeve, a second sleeve rotatably disposed about the second pin, and a second structure mounting said second sleeve on the second frame on an axis normal to the support columns of the second frame.

15. An agricultural vehicle comprising the combination of claim 14 wherein the second pin is provided with a collar extending thereabout and the second structure includes an apertured plate disposed about the second pin between the collar and the kingpin in slidable abutment with the collar to provide a stop against translation of the second pin.

16. An agricultural vehicle comprising the combination of claim 14 wherein the second pin extends from the lower end of the first sleeve, and the second structure includes an elongated member mounted between the second frame and the end of the first sleeve opposite the second pin.

17. An agricultural vehicle comprising the combination of claim 16 in combination with means for steering the vehicle comprising a pair of hydraulic cylinders, one of said hydraulic cylinders being mounted between one side of the first sleeve and one of the adjacent support columns of the first frame, and the other hydraulic cylinder being mounted between the other side of the first sleeve and the other adjacent support column of the first frame.

* * * * *

UNITED STATES PATENT OFFICE
CERTIFICATE OF CORRECTION

Patent No. 3,878,911                     Dated April 22, 1975

Inventor(s) William J. Nichols

It is certified that error appears in the above-identified patent and that said Letters Patent are hereby corrected as shown below:

Col. 1, line 65, delete "planned" and insert -- plan -- ;

Col. 2, line 39, after "housings" insert -- 46 and 48 --

Col. 2, line 46, after "column" delete "36" and insert -- 34 --

Col. 2, line 47, after column, delete "34" and insert -- 36 --

Col. 2, line 48, after "columns" delete "36 and 34" and insert -- 34 and 36 --

Col. 2, line 67, delete "intersection" and insert -- intersections --

Col. 2, line 68, after "legs 58" delete "60, 62" and insert -- and 62, and 60 --

Col. 4, line 43, after "sump" insert -- 190 --

Col. 5, line 44, after contact, delete "of"

Col. 5, line 44, before "wheels" insert -- lower of the --

Col. 5, line 59, delete "forward" and insert --rearward support --

Col. 5, line 60, delete "forward" and insert -- rearward support --

Col. 6, line 40, delete "couplers" and insert -- screw fittings --

UNITED STATES PATENT OFFICE
CERTIFICATE OF CORRECTION

Patent No. 3,878,911                  Dated April 22, 1975

Inventor(s) William J. Nichols

It is certified that error appears in the above-identified patent and that said Letters Patent are hereby corrected as shown below:

Page 2

Col. 6, line 50, after "sprayer" delete "is attached to a" and insert -- has a sprayer --

Col. 6, line 53, before "250" delete "Frame" and insert -- Sprayer frame --

Col. 6, line 54, after "108" insert -- of the rear frame 12 --

Col. 6, line 54, before "frame" insert -- sprayer --

Col. 6, line 54, after "frame" insert -- 250 --

Col. 6, line 56, after "mounted" delete "on" and insert -- at opposite ends on an upper bar 262 and a lower bar 264 of --

Col. 6, line 57, after "256" insert -- , the axis of elongation of the frame 256 --

Col. 6, line 63, delete "frame 256 has an"

Col. 6, line 63, after "262" delete "which" and insert -- of the frame 256 --.

Col. 7, line 1, before "frame" insert -- rear --

Col. 7, line 1, after "frame" delete "10" and insert -- 12 --

Col. 8, line 38, before "frame" delete "front"

Col. 8, line 41, before "thereof" delete one "sides"

UNITED STATES PATENT OFFICE
CERTIFICATE OF CORRECTION

Patent No. 3,878,911　　　　　Dated April 22, 1975

Inventor(s) William J. Nichols

It is certified that error appears in the above-identified patent and that said Letters Patent are hereby corrected as shown below:

Page 3

Col. 8, line 46 & 47, after "mounted" delete "having a first and second port on the base of the front" and insert -- on the --

Col. 8, line 52 & 53, after "portion" delete "the end portions extending from opposite ends of the central portion,"

Col. 8, line 54 after "motors" insert -- having a pair of ports, one of said hydraulic motors being --

Col. 8, line 55 before "end" insert -- one --

Col. 8, line 55, after "legs" insert -- and the other of said hydraulic motors being mounted on the other end portion of the legs, said hydraulic motors --

Col. 8, line 55, delete "axes" and insert -- shafts --

Col. 8, lines 56, 57 & 58, delete "one of said motors being mounted on the one end portion of each leg and having a pair of hydraulic"

Col. 8, line 58 before "ports" insert -- the --

Col. 8, line 58, after "ports" insert -- of one of said hydraulic motors being --

Col. 8, lines 59 & 60, delete "each leg respectively" and insert -- said legs, and --

Col. 8, lines 60, 61 & 62, delete "other of said motors being mounted on the other end portion of each leg and having a pair of hydraulic"

UNITED STATES PATENT OFFICE
CERTIFICATE OF CORRECTION

Patent No. 3,878,911  Dated April 22, 1975

Inventor(s) William J. Nichols

It is certified that error appears in the above-identified patent and that said Letters Patent are hereby corrected as shown below:

Page 4

Col. 8, line 62, after "ports" insert -- of the other of said hydraulic motors being --

Col. 8, line 63, delete "each leg respectively" and insert -- said legs --

Col. 9, line 4, delete "first" and insert -- one --

Col. 9, line 26, delete "first" and insert -- third --

Col. 9, line 27, after "elongation" insert -- of the second frame --

Col. 9, line 28, delete "second" and insert -- fourth --

Col. 9, line 29, delete "first" and insert -- third --

Col. 9, line 35, before "a second" insert -- the end portions of both legs being mounted together, --

Col. 9, line 35, delete "a second pair of" and insert -- third and a fourth --

Col. 9, line 35, delete "motors" and insert -- motor having a pair of ports, the third hydraulic motor being --

Col. 9, line 35, after "mounted on", deltet "the" and insert --one

Col. 9, line 36, delete "portions" and insert -- portion --

Col. 9, line 37 before "said" insert -- and the fourth hydraulic motor being mounted on the other end portion of the legs of the second yoke assembly --

UNITED STATES PATENT OFFICE
CERTIFICATE OF CORRECTION

Patent No. 3,878,911   Dated April 22, 1975

Inventor(s) William J. Nichols

It is certified that error appears in the above-identified patent and that said Letters Patent are hereby corrected as shown below:

Page 5

Col. 9, line 37, after "said" insert -- third and fourth --

Col. 9, line 37 delete "axes" and insert -- shafts --

Col. 9, lines 38, 39 & 40 delete "one of said motors being mounted on the one end portion of each of the second leg assembly having a pair of hydraulic ports" and insert -- the ports of the third motor being --

Col. 9, lines 42, 43, 44, and 45, delete "respectively, the other of said motors of the second pair being mounted on the other end portion of each leg of the second leg assembly and having a pair of hydraulic ports" and insert -- of the second leg assembly, and the ports of the fourth motor being --

Col. 9, line 46 delete "each leg" and insert -- the legs --

Col. 9, line 46 delete "respectively"

Col. 9, line 47, delete "one of the" and insert -- the third --

Col. 9, line 47 & 48 delete "motors" and insert -- motor --

Col. 9, line 48 delete "of the second pair and"

Col. 9, line 49 delete "other"

Col. 9, lines 49 & 50 delete "of the second pair"

Col. 10, line 1, delete "first" and insert -- third --

UNITED STATES PATENT OFFICE
CERTIFICATE OF CORRECTION

Patent No. 3,878,911          Dated April 22, 1975

Inventor(s) William J. Nichols

It is certified that error appears in the above-identified patent and that said Letters Patent are hereby corrected as shown below:

Page 6

Col. 10, line 2, delete "of the second frame"

Col. 10, line 4, delete "second" and insert -- fourth --

Col. 10, lines 4 & 5, delete "of the second frame"

Col. 10, line 6, delete "first" and insert -- one --

Signed and sealed this 15th day of July 1975.

(SEAL)
Attest:

RUTH C. MASON
Attesting Officer

C. MARSHALL DANN
Commissioner of Patents
and Trademarks